(12) United States Patent
Kim (10) Patent No.: US 11,091,325 B2
(45) Date of Patent: Aug. 17, 2021

(54) DIVERTER FOR TRANSFERRING CONVEYOR

(71) Applicants: HWADONG HIGHTECH CO., LTD, Incheon (KR); Dong Hwan Kim, Incheon (KR)

(72) Inventor: Dong Hwan Kim, Incheon (KR)

(73) Assignee: HWADONG HIGHTECH CO., LTD, Incheon (KR)

( * ) Notice: Subject to any disclaimer, the term of this patent is extended or adjusted under 35 U.S.C. 154(b) by 0 days.

(21) Appl. No.: 16/921,088

(22) Filed: Jul. 6, 2020

(65) Prior Publication Data
US 2021/0009363 A1   Jan. 14, 2021

(30) Foreign Application Priority Data
Jul. 9, 2019  (KR) .................. 10-2019-0082485

(51) Int. Cl.
| | | |
|---|---|---|
| *B65G 47/54* | (2006.01) | |
| *B65G 47/52* | (2006.01) | |
| *B65G 39/12* | (2006.01) | |
| *B65G 13/06* | (2006.01) | |

(52) U.S. Cl.
CPC ............. *B65G 47/52* (2013.01); *B65G 13/06* (2013.01); *B65G 39/12* (2013.01); *B65G 2201/02* (2013.01); *B65G 2207/34* (2013.01); *B65G 2811/0657* (2013.01)

(58) Field of Classification Search
None
See application file for complete search history.

(56) References Cited

U.S. PATENT DOCUMENTS

| | | | | |
|---|---|---|---|---|
| 5,222,585 A | * | 6/1993 | van der Werff | B65G 13/07 193/35 MD |
| 6,889,815 B2 | * | 5/2005 | Kanamori | B65G 1/0478 198/369.4 |
| 7,040,478 B2 | * | 5/2006 | Ehlert | B65G 13/10 198/369.4 |
| 7,971,701 B2 | * | 7/2011 | Fourney | B65G 17/24 198/370.09 |
| 8,800,748 B2 | * | 8/2014 | Yap | B65H 9/16 198/410 |
| 2015/0259156 A1 | * | 9/2015 | Henry | B65G 47/54 198/370.1 |

FOREIGN PATENT DOCUMENTS

| | | |
|---|---|---|
| JP | 3516343 B1 | 4/2004 |
| KR | 20-2000-0013536 U | 7/2000 |
| KR | 20120103422 A | 9/2012 |
| KR | 20150131739 A | 11/2015 |
| KR | 101615854 B1 | 4/2016 |

* cited by examiner

*Primary Examiner* — Kavel Singh
(74) *Attorney, Agent, or Firm* — Rothwell, Figg, Ernst & Manbeck, P.C.

(57) ABSTRACT

A diverter for a transferring conveyor comprises a carrier module. The carrier module is provided which includes the first and second transfer roll groups, a rotation drive part, elastic support portions and a turning variable part. At least one carrier module is disposed on a conveyor according to a package transfer direction to turn the plurality of transfer rolls using the turning motor so as to change a transfer direction of a package.

3 Claims, 12 Drawing Sheets

DIVERTER FOR TRANSFERRING CONVEYOR

CROSS-REFERENCE TO RELATED APPLICATION

This application claims priority to and the benefit of Korean Patent Application No. 2019-0082485, filed on Jul. 9, 2019, the disclosure of which is incorporated herein by reference in its entirety.

BACKGROUND

1. Field of the Invention

The present invention relates to a diverter installed on a conveyor configured to transfer a package, and more specifically, to a diverter for a transferring conveyor allowing a close contact state between an outer surface of a transfer roll and an outer circumferential surface of a rotation drive shaft to be constantly and stably maintained regardless of a turning position of the transfer roll or a change in outer diameter thereof due to surface wear.

2. Discussion of Related Art

Generally, conveyor systems for transferring packages are systems configured to consecutively transfer and transport packages, which are various kinds of transfer target objects, at warehouses, logistics service companies, sites treating various packages, and the like and are divided into belt type, chain type, and roller type conveyor systems for transferring packages.

The conveyor system for transferring a package classifies packages at sites, at which various kinds of packages are piled, according to kinds and sizes thereof, to store the packages at other sites and transport the packages to desired sites, or to transfer and transport the packages to pile the packages at specific sites for a predetermined time before the received package is released.

That is, when a conveyor system for transferring a package is driven, a conveyor such as a belt, roller, chain, or the like, is operated, an operator positioned at one side of the conveyer system loads a package on an upper surface of the operated and driven conveyor so that the package loaded on the conveyor is transferred and transported to an operator positioned at the other side of the conveyor system by the rotating conveyor.

However, in the case of the conveyor system for transferring a package, since the conveyer rotates and transfers the package from a starting point to an end point, that is, from one side to the other side, of the conveyor system in one direction, one kind of packages should be selected and transferred or an operator should classify various kinds of packages one by one at the end point of the conveyor system according to the kinds, and thus there is a problem in that work efficiency and productivity are reduced due to the package classification work.

In addition, in the case in which the operator classifies the packages one by one according to the kinds thereof at the end point of the conveyor system for transferring a package, there are problems in that it is difficult to efficiently classify the packages and it is also inefficient due to incorrect classification work.

(Patent Document 1) KR10-2009-0065032 A
(Patent Document 2) KR10-1615854 B1

In Patent Document 1, a diverter is disclosed which is provided at a longitudinal center of a conveyor system and changes a transfer direction of a package which is a transfer target object to improve working efficiency by more simply and rapidly performing an operation of classifying various kinds of packages.

However, such a conventional diverter has problems in that drive motors for selectively driving a multi transfer roller and a multi turning change roller according to a choice of a transfer direction or a changeable direction perpendicular to the transfer direction are required, an overall system is complicated because a plurality of multi rollers should be installed on an outer circumferential surface of a wheel disposed in a driving direction, and transfer efficiency is reduced and it is difficult to transfer a package at a high speed due to unnecessary contact between the unselected multi rollers and the package.

In addition, since the package can be transferred in only two directions including the transfer direction and the changeable direction perpendicular thereto, it is difficult to flexibly change a package transfer direction using the conveyor system according to a customer.

In Patent Document 2, a diverter is disclosed in which a plurality of carrier modules are disposed on a conveyor in package transfer directions to rotate a rotation drive shaft in one direction at a high speed using a rotating motor, and a plurality of transfer rolls turned by an actuator are in contact with an outer surface of the rotation drive shaft rotated at the high speed to change a transfer direction in which a package is transferred in one direction.

However, when a plurality of transfer rolls circumscribed to the rotation drive shaft are turned a predetermined angle to change a transfer direction of a package which is a transfer target object from one linear direction to a slope direction, since a contact surface between an outer surface of the turned transfer roll and an outer surface of the normally positioned fixed rotation drive shaft is decreased, there are problems in that a package transfer speed is decreased as compared to when the package is linearly transferred, and a package transfer throughput per unit time is decreased due to the decreased package transfer speed.

In addition, when the outer diameter is decreased due to surface wear of the transfer roll, a contact force thereof with the rotation drive shaft is decreased to decrease a rotation speed of the transfer roll, and thus there are problems in that a transfer throughput and transfer efficiency for transferring the package are reduced and a use lifetime and a replacement time of the transfer roll are also decreased.

SUMMARY OF THE INVENTION

The present invention is directed to providing a diverter for a transferring conveyor, which allows a close contact state between an outer surface of a transfer roll and an outer circumferential surface of a rotating rotation drive shaft to be constantly and elastically maintained regardless of a turning position of the transfer roll, on which a package which is a transfer target object, is loaded or a change in outer diameter thereof due to surface wear.

The present invention is also directed to providing a diverter for a transferring conveyor which is capable of simultaneously turning transfer rolls of a pair of left and right first and second transfer roll groups circumscribed to a rotation drive shaft with quick response using a power transmission structure due to gear-coupling applied thereto.

Objectives that should be solved according to embodiments are not limited to the above described objectives, and other objectives which are not described above will be clearly understood by those skilled in the art from the following specification.

According to an aspect of the present invention, there is provided a diverter for a transferring conveyor comprising a carrier module including first and second transfer roll groups including a plurality of transfer rolls rotatably assembled to first assembly holes of roll brackets, a rotation drive part which includes a rotation drive shaft having a predetermined length and an outer circumferential surface circumscribed to the transfer rolls of the first and second transfer roll groups, which are disposed at both left and right sides of the rotation drive shaft, and a rotating motor connected to one end of the rotation drive shaft through a power transmission part to rotate the transfer rolls of the first and second transfer roll groups, and a turning variable part which includes a horizontal fixed plate rotatably supporting vertical rotation pins extending from block bodies, which are coupled to second assembly holes of the roll brackets using hinge shafts, and first and second upper gears provided on the plurality of vertical rotation pins corresponding to the plurality of transfer rolls of the first and second transfer roll groups disposed along the rotation drive shaft, first and second lower gears rotatably supporting first and second connection gears, which are disposed between and gear-coupled to first and second upper gears adjacent to each other along the rotation drive shaft, on the horizontal fixed plate and disposed on lower end portions of a pair of vertical rotation pins corresponding to a pair of transfer rolls which are selected from the plurality of transfer rolls of the first and second transfer roll groups, adjacent to each other, and disposed with the rotation drive shaft interposed therebetween, a turning motor configured to rotate drive gears gear-coupled to the first and second lower gears in a normal or reverse direction, and simultaneously turns the transfer rolls of the first and second transfer roll groups by a predetermined angle, wherein at least one carrier module is disposed on a conveyor according to a package transfer direction to turn the plurality of transfer rolls using the turning motor so as to change a transfer direction of a package.

The drive gears may include a large diameter drive gear simultaneously gear-coupled to the first and second lower gears to rotate the first and second lower gears in one direction and a small diameter drive gear provided on a drive shaft of the turning motor and gear-coupled to the large diameter drive gear.

The carrier module comprising an elastic support portions elastically support the transfer rolls toward the rotation drive shaft, the elastic support portions include elastic members including lower ends restricted by extension bars extending outward from the block bodies and upper ends restricted by protruding portions extending outward from the roll brackets.

The carrier module may include a module box having an inner space accommodating the first and second transfer roll groups, the rotation drive part, and the turning variable part, and a bottom plate which seals an open lower portion of the module box, and a turning motor may be perpendicular to and fixedly installed on a motor fixing bracket fixedly installed on the bottom plate to connect a small diameter drive gear of the drive gears exposed under the horizontal fixed plate and the drive shaft.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention that are easily performed by those skilled in the art will be described in detail with reference to the accompanying drawings. However, in detailed descriptions of structural principles of the exemplary embodiments of the present invention, when it is determined that detailed descriptions of related well-known functions and configurations unnecessarily obscure the gist of the present invention, the detailed descriptions thereof will be omitted.

In addition, parts performing similar functions and operations throughout the drawings are denoted by the same reference numerals.

In addition, throughout this specification, when a part is referred to as being "connected" to another part, it includes "directly connected" and "indirectly connected" via an intervening part. Also, when a certain part "includes" a certain component, this does not exclude other components unless explicitly described otherwise, and other components may in fact be included.

As illustrated in FIG. 1 to FIG. 10B, a diverter 100 for a transferring conveyor according to an exemplary embodiment of the present invention includes at least one or more carrier modules 100a installed on a conveyor configured to transfer a package which is a transfer target object such as a box object and disposed in package transfer directions between two or more branched output side branch conveyors 200b and an input side conveyor 200a to selectively change a transfer direction of a package received through the input side conveyor 200a to any one side of the output side branch conveyors 200b.

The carrier module 100a includes first and second transfer roll groups 110a and 110b including pluralities of transfer rolls 110, a rotation drive part 120 configured to rotate the transfer rolls to generate a package transfer force, elastic support portions 130 which elastically support the transfer roll, and a turning variable part 140 configured to turn the transfer rolls 110 to change a package transfer direction.

The transfer rolls 110 provided in the first and second transfer roll groups 110a and 110b may be formed as substantially hollow cylindrical roll members in which roll shafts 115 are rotatably assembled to roll brackets 111 and of which outer surfaces are in contact with a package which is a transfer target object.

The transfer rolls 110 may be formed as roll type members in which both ends of the roll shafts 115 are rotatably assembled to first assembly holes 112 formed to pass through upper portions of the roll brackets 111 and of which the outer surfaces are in contact with the package which is a transfer target object.

The transfer rolls 110 may be formed of an elastic material such as a rubber material to increase frictional force against the package and a frictional force against a rotation drive shaft so as to improve transfer efficiency.

The roll brackets 111 may be formed as roll support structures including a pair of left and right plate members in which the first assembly holes 112, to which both ends of the roll shafts 115 of the transfer rolls 110 are assembled, are formed to pass through the upper portions thereof, and second assembly holes 113 to which both ends of hinge shafts 132 coupled to block bodies 131, which will be described below, are formed to pass through lower portions thereof, and having a cross-section of a substantially '⊏' shape of which an upper portion is open The roll bracket 111 is connected to the block body 131 of the elastic support portion 130 using the hinge shaft 132 and rotatably assembled around the hinge shaft 132 which is parallel to the roll shaft.

Figure 1:
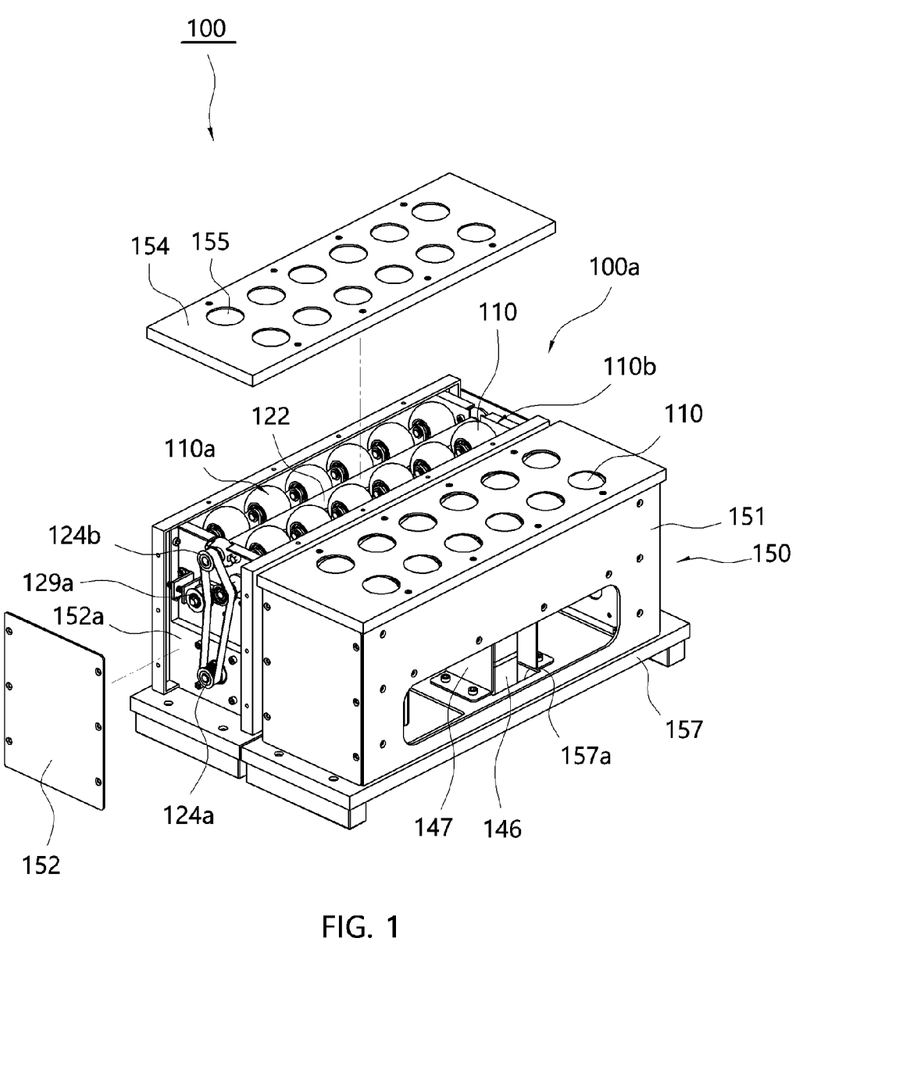
FIG. 1 is an overall perspective view illustrating a diverter for a transferring conveyor according to an embodiment of the present invention.
Figure 2:
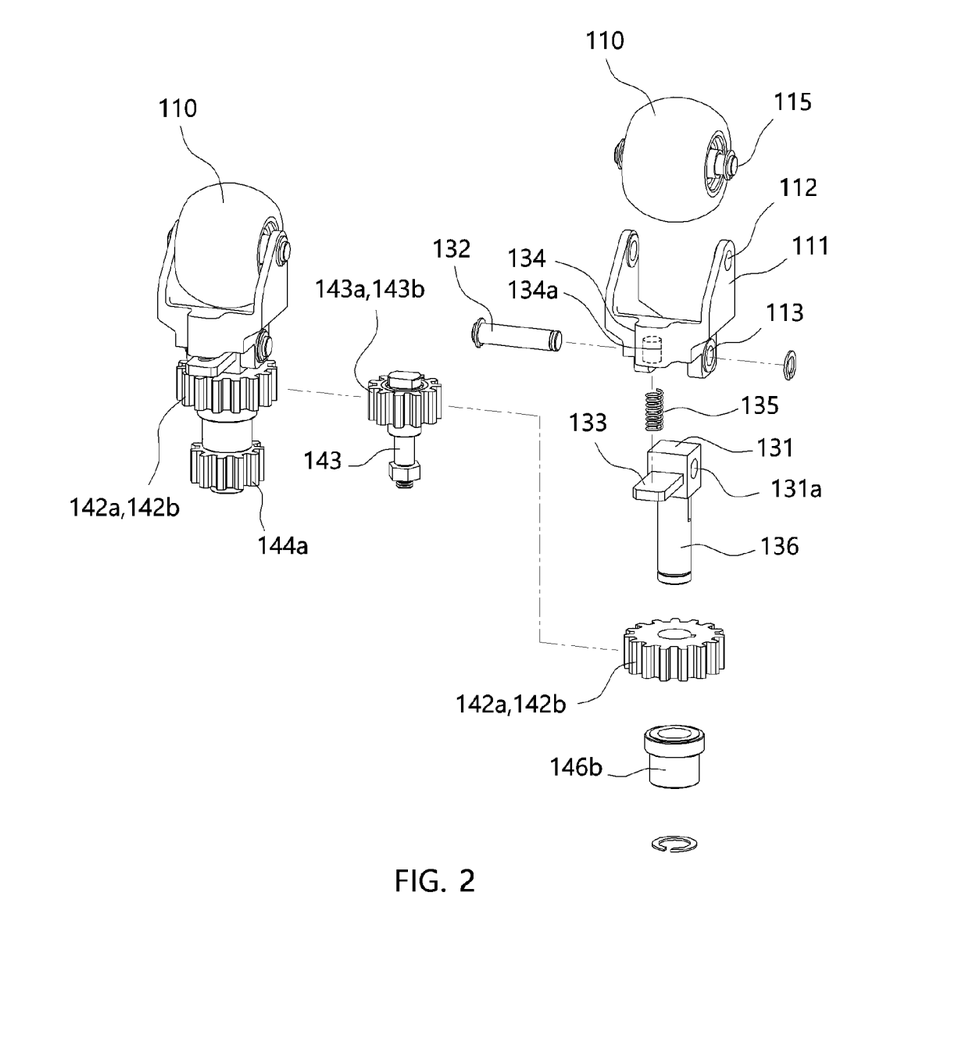
FIG. 2 is an exploded perspective view illustrating a coupling state of a transfer roll and an elastic support portion which are used in the diverter for a transferring conveyor according to the embodiment of the present invention.
Figure 3:
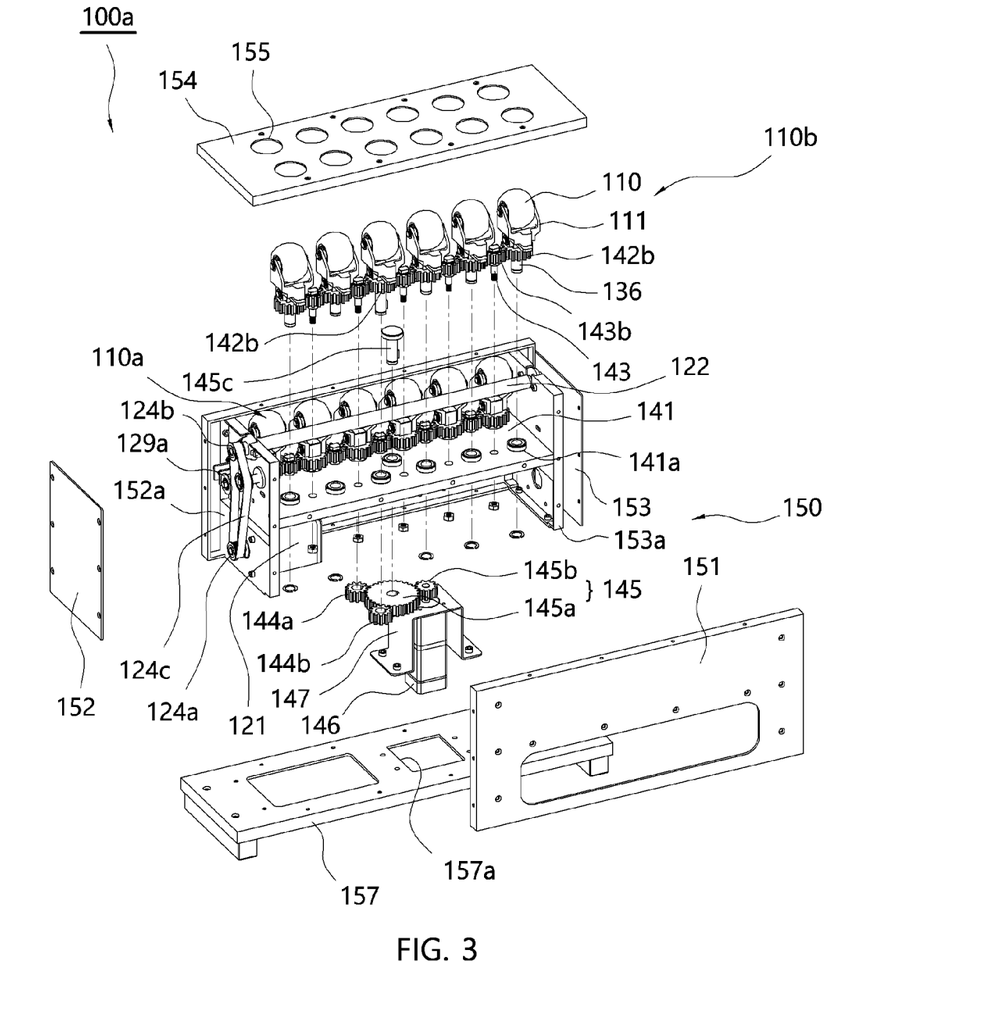
FIG. 3 is an exploded perspective view illustrating a carrier module used in the diverter for a transferring conveyor according to the embodiment of the present invention.
Figure 4A:
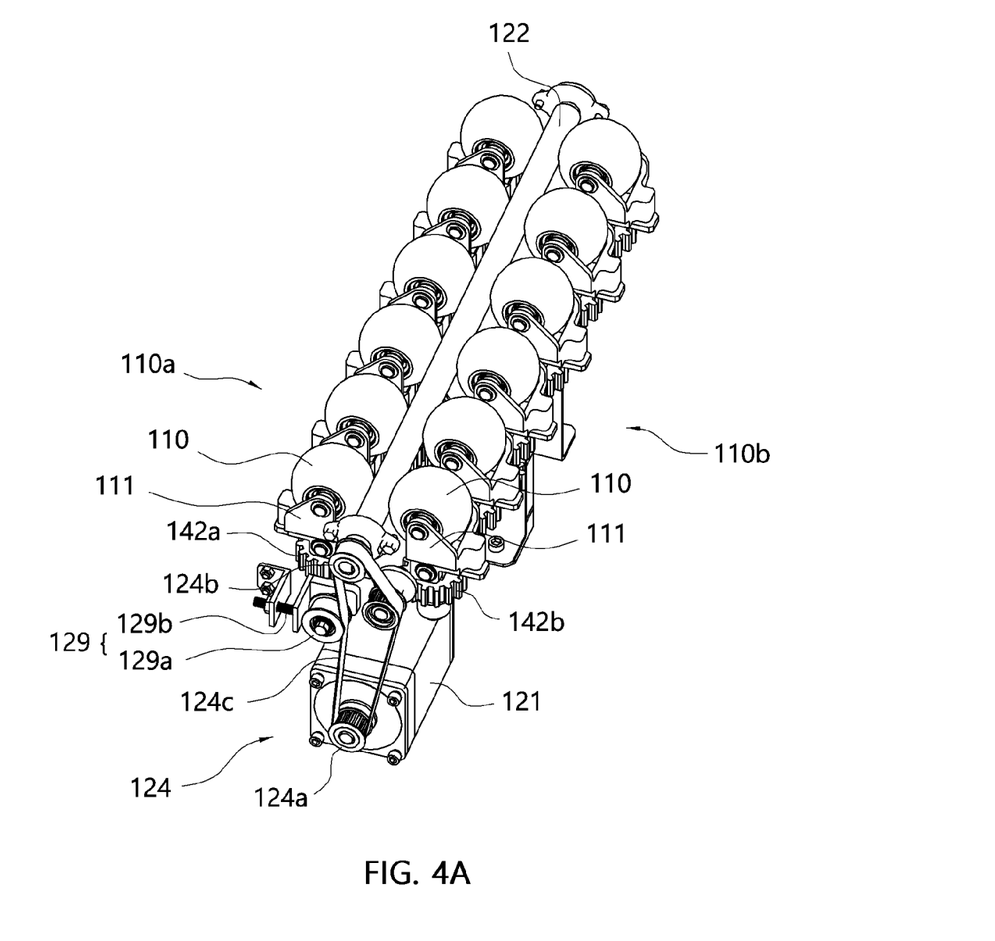
FIG. 4A is a perspective view illustrating the carrier module, which is viewed from above, used in the diverter for a transferring conveyor according to the embodiment of the present invention.
Figure 4B:
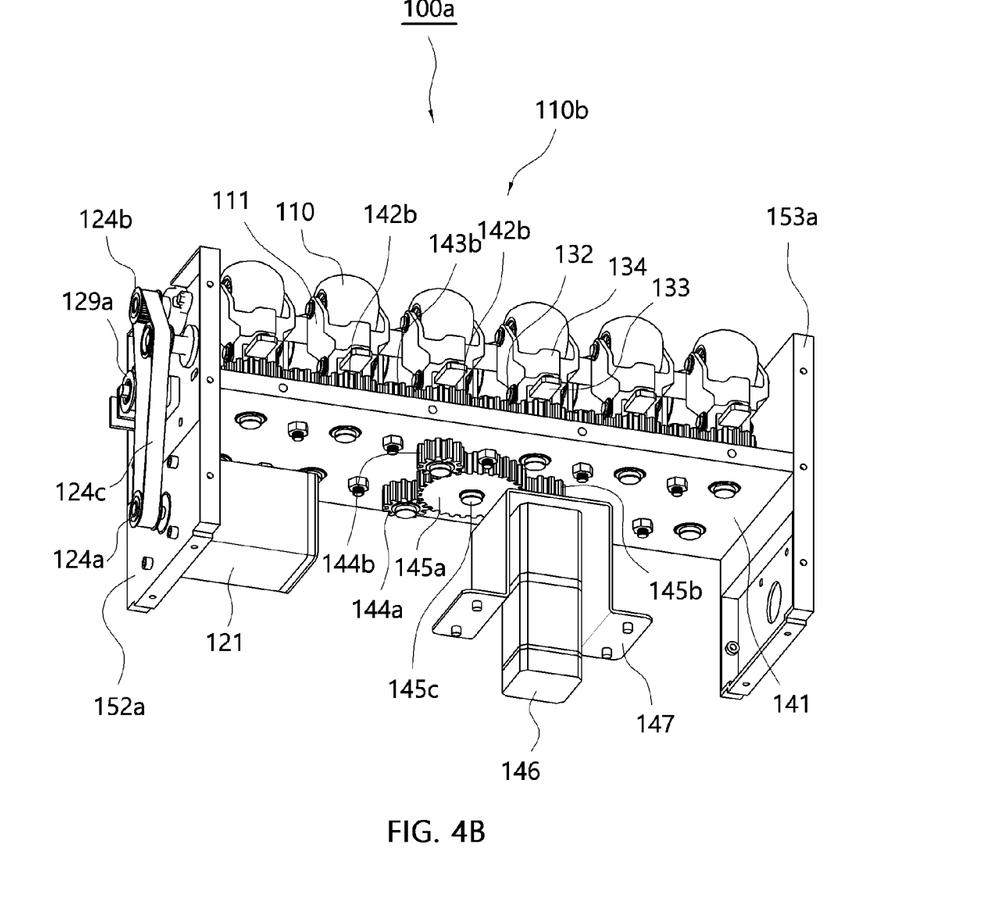
FIG. 4B is a perspective view illustrating the carrier module, which is viewed from below, used in the diverter for a transferring conveyor according to the embodiment of the present invention.
Figure 5:
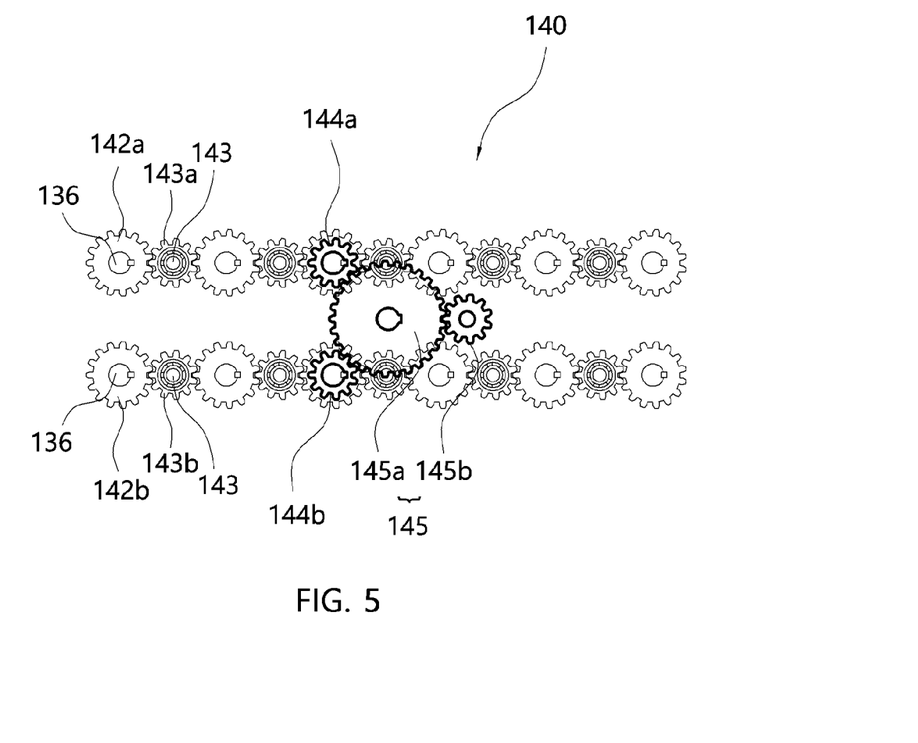
FIG. 5 is a plan view illustrating a gear configuration of a turning variable part used in the diverter for a transferring conveyor according to the embodiment of the present invention.
Figure 6:
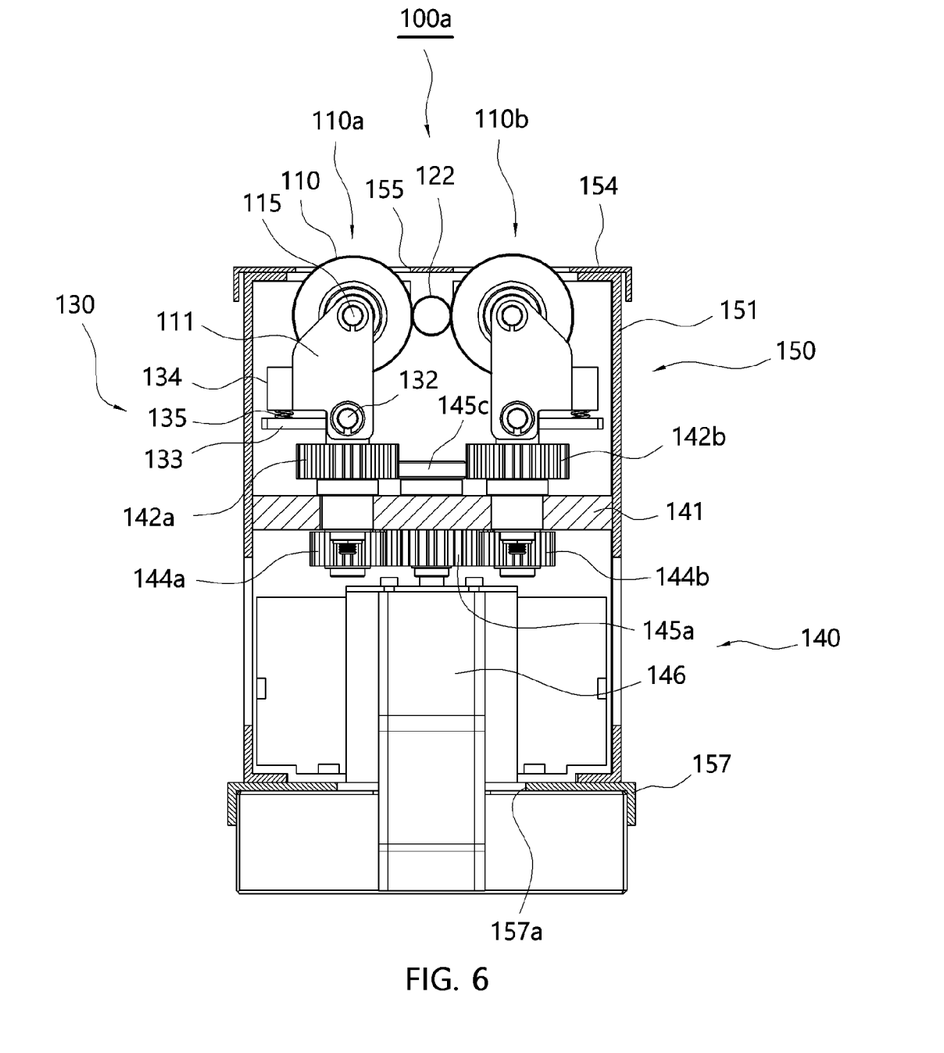
FIG. 6 is a side view illustrating the carrier module used in the diverter for a transferring conveyor according to the embodiment of the present invention.
Figure 7:
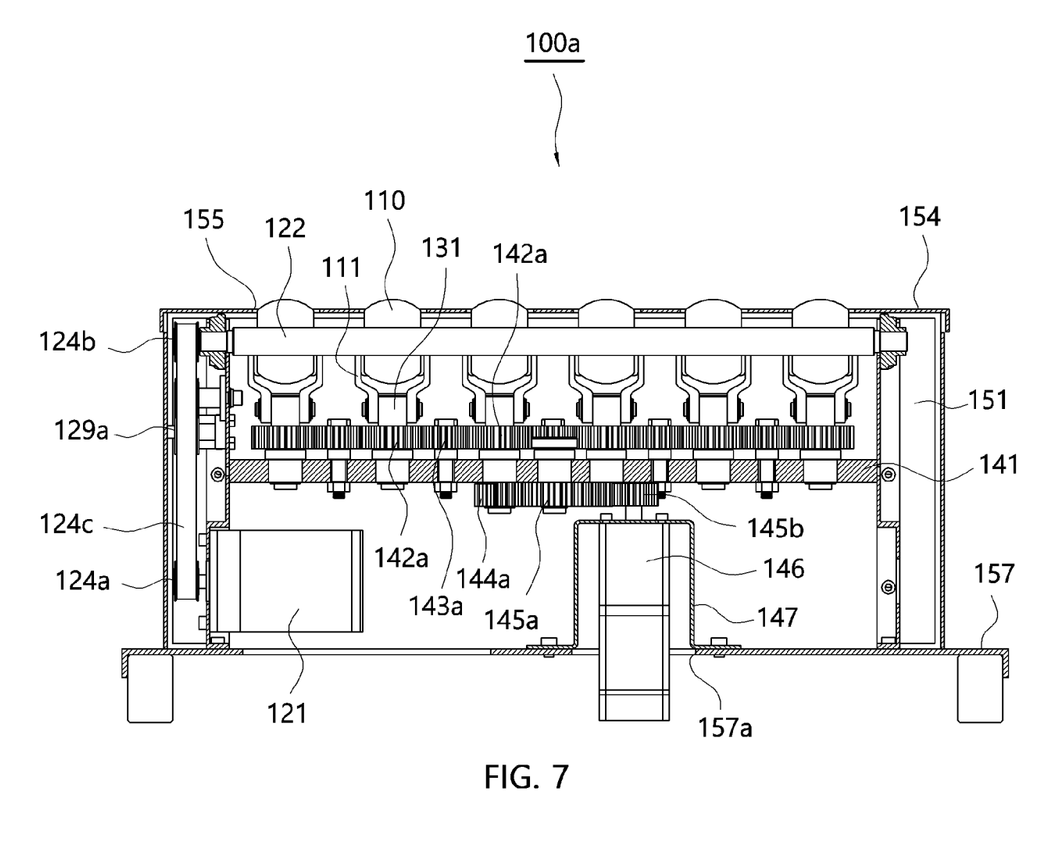
FIG. 7 is a front view illustrating an operating state of the carrier module used in the diverter for a transferring conveyor according to the embodiment of the present invention.
Figure 8A:
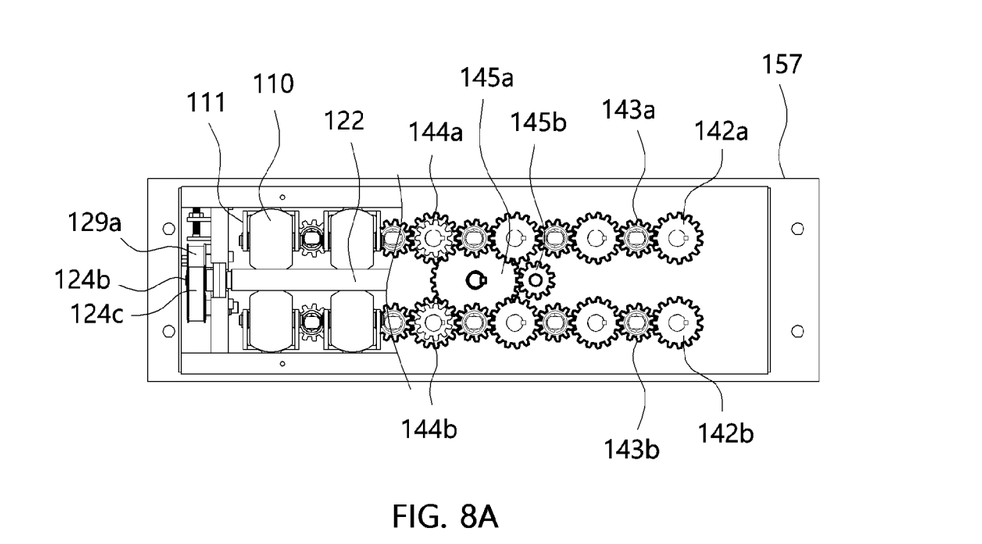
FIGS. 8A and 8B are plan views illustrating the operation state of the carrier module used in the diverter for a transferring conveyor according to the embodiment of the present invention.
Figure 8B:
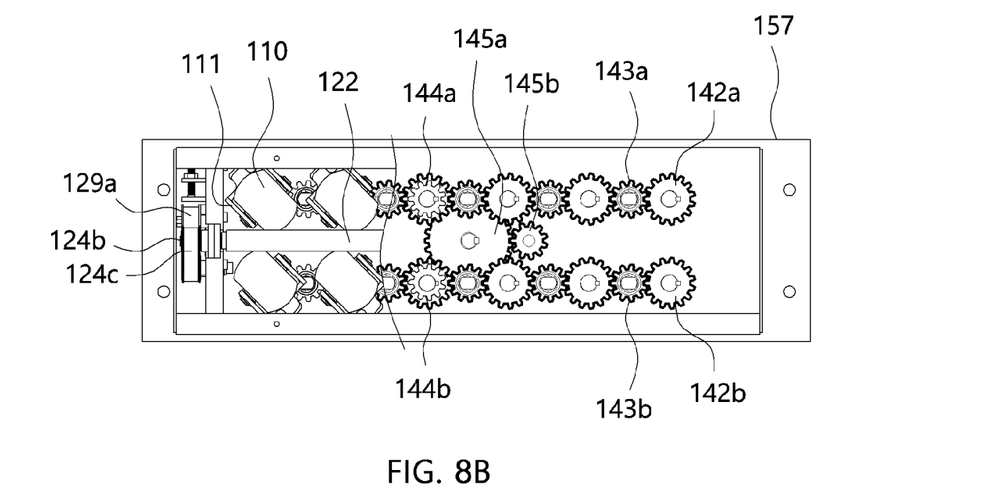
Figure 9A:
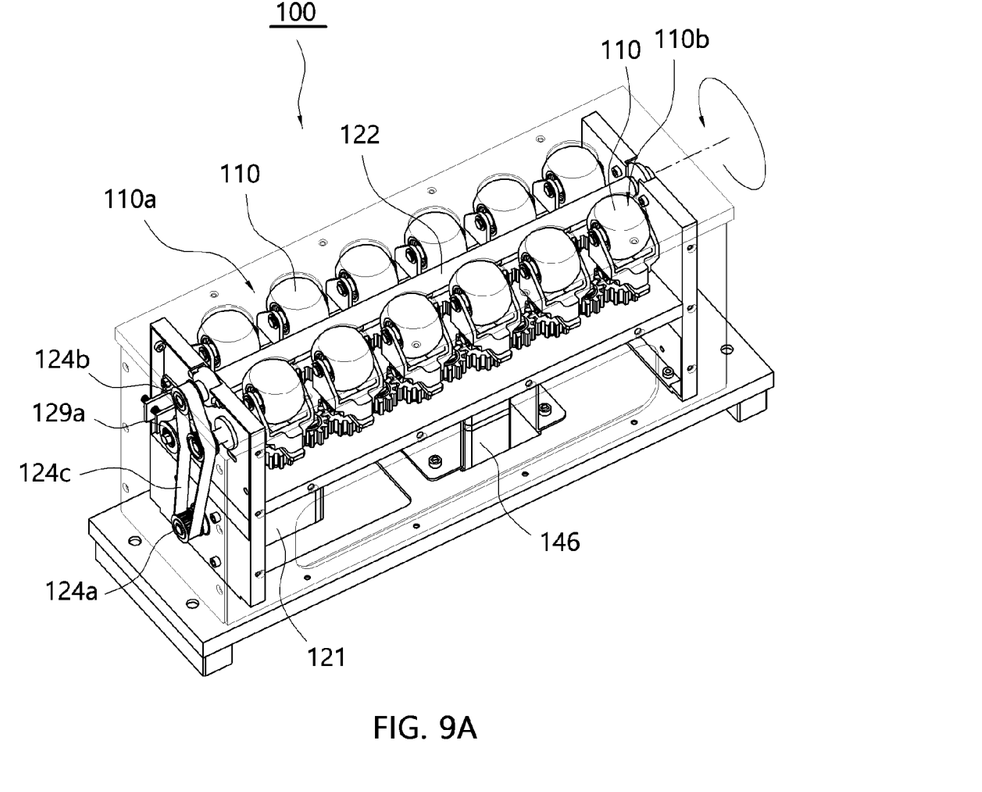
FIGS. 9A and 9B are perspective views illustrating the operation state of the carrier module used in the diverter for a transferring conveyor according to the embodiment of the present invention.
Figure 9B:
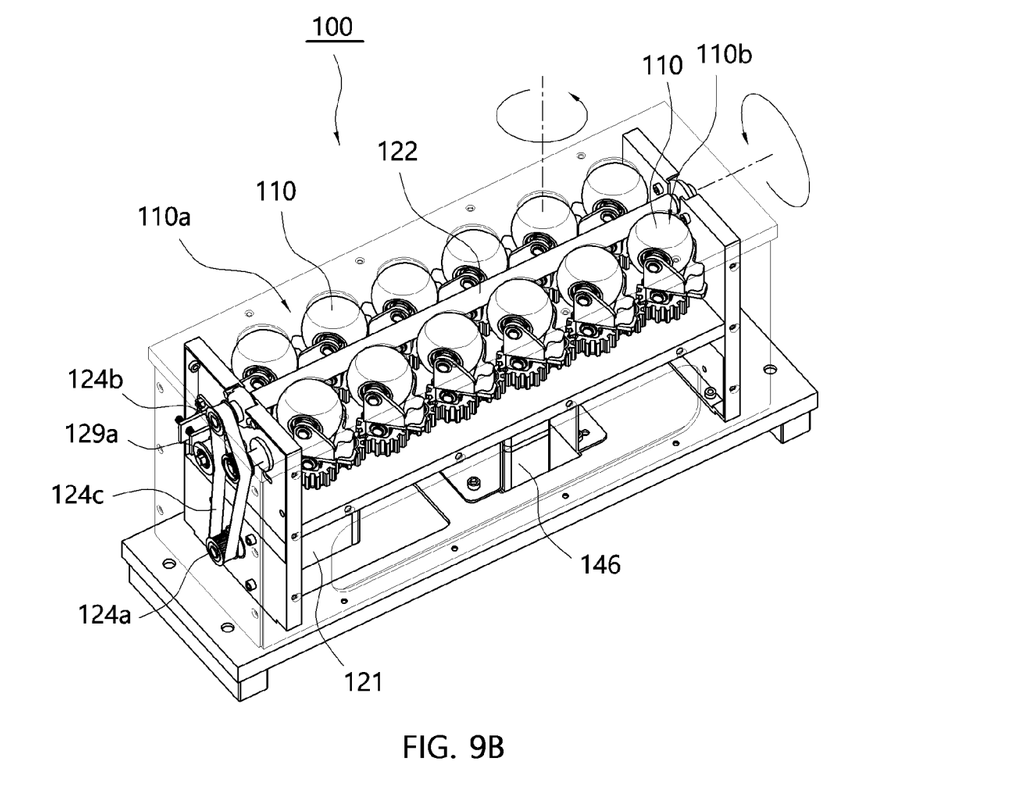
Figure 10A:
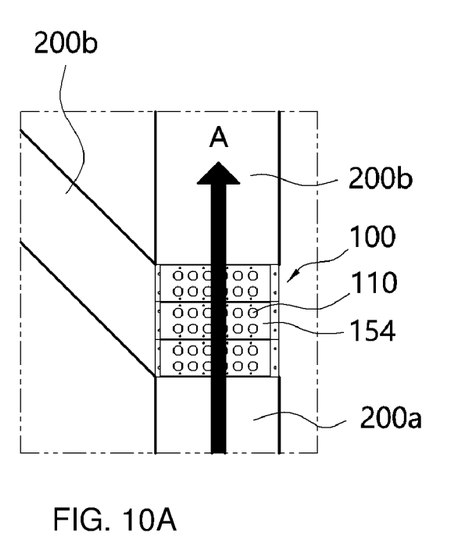
FIGS. 10A and 10B are views illustrating a use state of the diverter for a transferring conveyor according to the embodiment of the present invention.
Figure 10B:
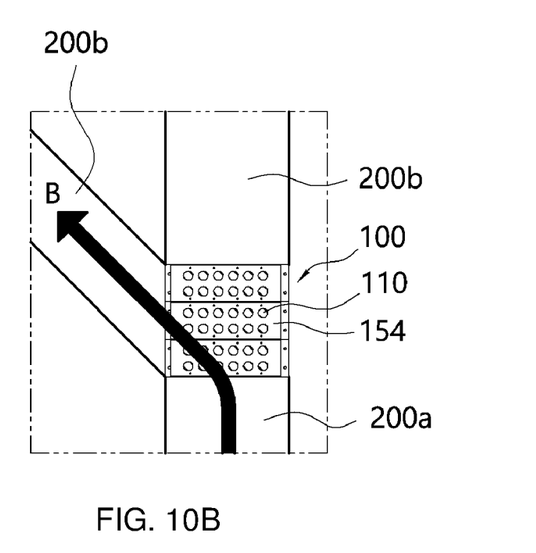

As illustrated in FIGS. 1 and 2, the rotation drive part 120 is a part which generates an external force to simultaneously forcibly rotate the plurality of transfer rolls 110 included in the first and second transfer roll groups circumscribed to the package in the same direction so as to forcibly transfer the package which is a transfer target object in one direction.

The rotation drive part 120 includes a rotation drive shaft 122 having a predetermined length to be simultaneously circumscribed to the outer surfaces of the transfer rolls 110 included in the first and second transfer roll groups 110a and 110b and a rotating motor 121 connected to one end of the rotation drive shaft 122 through a power transmission part 124 and providing a rotation driving force when electric power is applied thereto.

The power transmission part 124 includes a driving pully 124a provided on a drive shaft of the rotating motor 121, a driven pully 124b provided on any one of both ends of the rotation drive shaft 122, and a belt member 124c, such as a timing belt, provided between the driving pully 124a and the driven pully 124b to transmit a rotation driving force.

A coating layer such as a rubber material or friction generation grooves may be selectively formed at an outer surface of the rotation drive shaft 122 to generate a frictional force and increase the generated frictional force when in contact with the transfer roll 110.

Therefore, due to the rotation driving force of the rotating motor 121, the plurality of transfer rolls 110 may be simultaneously rotated around the roll shaft 115 in one direction by the rotation drive shaft circumscribed to the transfer rolls 110 of the first and second transfer roll groups 110a and 110b disposed to be parallel along both sides of the rotation drive shaft 122, and a transfer force to transfer the package loaded on the plurality of transfer rolls 110 in one direction is generated.

As illustrated in FIGS. 2, 3, 6, and 7, the elastic support portion 130 may include the block body 131 in which a hinge hole 131a corresponding to the second assembly hole 113 is formed to pass through the block body 131 and which is assembled to the second assembly hole 113 formed to pass through the lower portion of the roll bracket 111 using the hinge shaft 132, and the block body 131 may be provided under the roll bracket as an assembly type body.

An elastic member 135 is provided of which a lower end, which is one end thereof, is blocked and restricted by an extension bar 133 extending outward to a predetermined length from the block body 131 and an upper end, which is the other end thereof, is blocked and restricted by a protruding portion 134 extending outward to a predetermined length from the roll bracket 111.

In this case, a concave groove 134a may be concavely formed in the protruding portion 134 such that the upper end of the elastic member 135 formed of a coil spring is disposed to be inserted into and hooked by the concave groove 134a, and a stop member such as a stop pin or stop groove, to which the lower end of the elastic member is hooked and connected, may be formed in the extension bar 133.

Since the elastic member 135 is installed between the protruding portion 134 and the extension bar 133 to be replaceable, another elastic member having an elastic force having a different magnitude may simply be conveniently replaced and installed therebetween in consideration of a close contact force between the transfer roll assembled in the roll bracket and the rotation drive shaft.

In addition, the block body 131 includes a vertical rotation pin 136 formed directly thereunder and extending to a predetermined length and rotatably assembled to a connection hole formed to pass through a horizontal fixed plate 141, which will be described below.

The vertical rotation pin 136 may be formed as an integrated pin member extending from a lower surface of the block body or a pin member of which an upper end is assembled to be replaceable.

A plurality of vertical rotation pins 136 corresponding to the transfer rolls of the first and second transfer roll groups 110a and 110b are rotatably supported by the horizontal fixed plate 141 fixedly horizontally installed in a module box 150, which will be described below, using bushing members 141b.

Therefore, since the roll bracket assembled with the transfer roll is rotatably assembled around the horizontal hinge shaft assembled with the block body, and the roll bracket is constantly pressed and maintained toward the rotation drive shaft due to an elastic force of the elastic member, a contact state with the rotation drive shaft may be constantly and stably maintained regardless of a change in outer diameter of the transfer roll due to surface wear thereof, and thus generation of slip between contact portions of the rotation drive shaft and the transfer roll and reduction of a contact area between the rotation drive shaft and the transfer roll are prevented, and high speed rotation of the transfer roll which is turned to change direction is definitely stably secured.

In addition, since the roll bracket assembled to the transfer roll is rotatably assembled around the vertical hinge pin while maintaining the contact state between the transfer roll and the rotation drive shaft, the roll bracket is turned with the transfer roll about a virtual vertical axis perpendicular to the rotation drive shaft.

As illustrated in FIGS. 2, 3, 4, and 5, the turning variable part 140 may change a transfer direction in which a package is transferred on the conveyor to a straight direction A or changeable direction B by simultaneously turning the transfer rolls 110 of the first and second transfer roll groups 110a and 110b, which are disposed along both sides of the rotation drive shaft 122, by a predetermined angle θ.

The turning variable part 140 includes the horizontal fixed plate 141 fixedly installed in the module box to rotatably support the vertical rotation pin 136 formed directly thereunder and extending to the predetermined length downward from the block body 131 provided under the roll bracket 111.

The horizontal fixed plate 141 is assembled to the vertical rotation pins 136 using the bushing members 141b assembled to a plurality of connection holes 141a formed to pass through the horizontal fixed plate 141 at predetermined intervals.

In this case, the horizontal fixed plate 141 is formed in which the plurality of connection holes 141a are formed to pass through an upper surface corresponding to the transfer rolls of the first and second transfer roll groups 110a and 110b, and which is fixedly installed in the module box 150, which will be described below, and has a square plate shape.

First and second upper gears 142a and 142b are provided around the plurality of vertical rotation pins 136 corresponding to the plurality of transfer rolls of the first and second transfer roll groups disposed along the rotation drive shaft 122, and first connection gears 143a are provided which are disposed along the rotation drive shaft at one side corresponding to the first transfer roll groups 110a between the plurality of adjacent first upper gears 142a and which are gear-coupled to the plurality of first upper gears 142a.

Second connection gears 143b are provided which are disposed along the rotation drive shaft 122 at the other side corresponding to the second transfer roll groups 110b between the plurality of adjacent second upper gears 142b, and gear-coupled to the plurality of adjacent second upper gears 142b, and gear shafts 143 provided in the first and second connection gears 143a and 143b may be rotatably supported by the horizontal fixed plate 141.

The first and second upper gears 142a and 142b are provided as circular gears having outer diameters greater than outer diameters of the first and second connection gears 143a and 143b, and the plurality of vertical rotation pins 136 coupled to the first and second upper gears are rotated in one direction by the connection gears disposed between and gear-coupled to the upper gears arranged along the first and second transfer roll groups.

In addition, the first and second upper gears 142a and 142b and the first and second connection gears 143a and 143b may include spacers to prevent frictional resistance due to contact with the upper surface of the horizontal fixed plate 141.

Separation prevention rings are provided on lower end portions of the vertical rotation pins exposed downward through the connection holes of the horizontal fixed plate 141 to prevent separation and departure of the vertical rotation pins, and nut members may be provided at lower end portions of the gear shaft 143 exposed downward through the other connection holes of the horizontal fixed plate 141 to easily replace and install the first and second connection gears 143a and 143b.

In addition, first and second lower gears 144a and 144b are provided on the lower end portions of the pair of the vertical rotation pins 136 corresponding to the adjacent pair of transfer rolls with the rotation drive shaft, which is disposed therebetween, among the plurality of transfer rolls of the first and second transfer roll groups 110a and 110b.

The first and second lower gears 144a and 144b are gear members assembled to the lower end portions of the vertical rotation pins 136 externally exposed by passing through the connection holes formed in the horizontal fixed plate from the upper portion to a lower portion thereof, and the vertical rotation pins to which the first and second lower gears are assembled may be provided as pin members extending to a length greater than a length of the other vertical rotation pins.

Drive gears 145 are provided which are gear-coupled to the first and second lower gears 144a and 144b separated by the rotation drive shaft 122 interposed therebetween, and a turning motor 146 is provided which provides a rotation driving force to rotate the drive gears 145 in a normal or reverse direction.

The drive gears 145 include a large diameter drive gear 145a which is simultaneously gear-coupled to the first and second lower gears 144a and 144b and rotates the first and second lower gears 144a and 144b in one direction, and a small diameter drive gear 145b provided on a drive shaft of the turning motor 146 and gear-coupled to the large diameter drive gear 145a, and the large diameter drive gear 145a is assembled to another gear shaft 145c rotatably supported by the another connection hole formed to pass through the horizontal fixed plate.

Therefore, when the turning motor rotates in the normal or reverse direction and a rotation driving force is transmitted to the first and second lower gears through the drive gears including the large diameter and the small diameter drive gear and the first and second lower gears are rotated by a predetermined angle in the normal or reverse direction, since the vertical rotation pins coupled to the first and second lower gears are rotated in the same direction as those of the first and second lower gears, the transfer rolls of the first and second transfer roll groups disposed at both sides of the rotation drive shaft are simultaneously turned by a predetermined angle with the vertical rotation pins due to the first and second connection gears gear-coupled between the first and second upper gears provided on vertical connection pins corresponding to the transfer rolls of the first and second transfer roll groups.

In this case, a turning range within which the transfer roll 110 turns by a predetermined angle may be adjusted by a size of a rotation angle of the drive gear rotated by the turning motor.

In addition, since the first and second transfer roll groups 110a and 110b including the plurality of transfer rolls 110 are provided at both sides of the rotation drive shaft 122 and simultaneously circumscribed to the outer surface of the rotation drive shaft 122, and the plurality of transfer rolls are simultaneously turned in one direction due to gear-coupling between the upper and lower gears 142a, 142b, 144a, and 144b and the connection gears 143a and 143b, the plurality of transfer rolls may be rotated and a package transfer direction may be changed by one rotating motor 121 and one turning motor 146, and thus an overall structure can be simplified, the number of the components can be decreased, and efficiency of transferring a package in a straight direction or changing a direction to a changeable direction and transferring the package can be improved.

Meanwhile, as illustrated in FIGS. 1, 3, 6, and 7, the carrier module 100*a* includes the module box 150 which has a substantially hexahedron shape and includes a pair of left and right side plates 151 and front and rear plates 152 and 153 coupled to the pair of left and right side plates 151 to form an inner space having a predetermined size into which the plurality of transfer rolls 110 included in the first and second transfer roll groups, the rotation drive part 120, the elastic support portion 130, and the turning variable part 140 are disposed to be simultaneously inserted.

The module box 150 includes a cover member 154 which includes a plurality of exposure holes 155 which are formed to pass through the cover member 154 as substantially circular open windows and disposed at positions corresponding to the transfer rolls to externally expose parts of the outer surfaces of the transfer rolls 110, and covers an open upper portion of the module box 150.

In addition, inner vertical plates 152*a* and 153*a* supporting both ends of the rotation drive shaft 122 are provided inside the front and rear plates 152 and 153 of the module box 150.

Both ends of the horizontal fixed plate are detachably assembled to the inner vertical plates 152*a* and 153*a* integrally provided in the module box 150 using a plurality of coupling members.

In addition, a bottom plate 157 is provided which seals an open lower portion of the module box 150, the turning motor is perpendicular to and fixedly installed on a motor fixing bracket 147 fixedly installed on the bottom plate such that the small diameter drive gear 145*b* of the drive gears 145 exposed to the lower portion of the horizontal fixed plate is connected to the drive shaft, and an opening portion 157*a* through which a lower end portion of the turning motor 146 fixedly installed to be perpendicular thereto is exposed downward may be formed by cutting the bottom plate 157.

In addition, a belt tension adjust portion 129 which adjusts a tension of the belt member 124*c* connecting the driving pully 124*a* provided around the drive shaft of the rotating motor 121 and the driven pully 124*b* provided around the rotation drive shaft 122 is provided on the inner vertical plate 152*a* disposed at one side corresponding to the power transmission part 124.

The belt tension adjust portion 129 may include a screw bar 129*b* configured to move a contact roll 129*a*, of which an outer circumferential surface is circumscribed to one surface of the belt member 124*c* and which is idly rotated, toward and away from the belt member.

Therefore, when the screw bar is moved toward or away from the belt member, the tension of the belt member may be properly adjusted by moving a position of the contact roll circumscribed to the belt member toward or away from the belt member.

As illustrated in FIGS. 8A, 8B, 9A, 9B, 10A, and 10B, when the rotating motor 121 rotates, since the plurality of transfer rolls 110 included in the first and second transfer roll groups 110*a* and 110*b* are circumscribed to the rotation drive shaft 122, the carrier module 100*a* included in the diverter for a transferring conveyor, which has the above-described structure, generates a transfer force to rotate the plurality of transfer rolls in a direction in which the plurality of transfer rolls are gear-coupled to the rotation drive shaft 122 and to transfer a package loaded on the transfer rolls in one direction.

In this case, since the roll shaft 115 of the transfer roll 110 enters a state in which the roll shaft 115 is disposed to be parallel to the rotation drive shaft 122, a package transferred from the input side conveyor 200*a* is guided to be transferred in the straight direction A.

In addition, since the transfer roll 110 to which the roll bracket 111 is assembled is rotatably assembled around the hinge shaft 132 and elastically supports the transfer roll circumscribed to the rotation drive shaft using an elastic force of the elastic member 135 provided between the extension bar 133 and the protruding portion 134, a contact state between the transfer roll 110 and the rotation drive shaft is stably maintained and the transfer roll is rotated at a speed corresponding to a rotation speed of the rotation drive shaft to transfer a package regardless of a change in outer diameter due to surface wear of the transfer roll.

In such a state, in a case in which a package transfer direction needs to be changed, when the turning motor 146 rotates to rotate the drive gears including the large diameter drive gear and the small diameter drive gear by a predetermined angle, the first and second lower gears gear-coupled to the large diameter drive gear under the horizontal fixed plate are rotated by the predetermined angle and the pair of vertical rotation pins including the first and second lower gears are also rotated by the predetermined angle in conjunction with the rotation of the first and second lower gears.

Then, since the plurality of vertical rotation pins corresponding to the transfer rolls of the first and second transfer roll groups above the horizontal fixed plate are rotated by the predetermined angle in the same direction as the above direction by the first and second connection gears disposed between and gear-coupled to first and second upper gears arranged along the rotation drive shaft, the roll shafts of the transfer rolls disposed to be parallel to the rotation drive shaft 122 can be turned by the predetermined angle θ.

Therefore, a transfer direction of a package which is loaded on, in contact with, and transferred by the transfer roll 110 is quickly changed from the straight direction A to the changeable direction B.

In this case, since turning of the transfer roll 110 is performed in a state in which the outer surface of the transfer roll is in elastic contact with the outer circumferential surface of the rotation drive shaft due to an elastic force of the elastic member 135, a contact position of the outer surface of the transfer roll circumscribed to the normally positioned rotation drive shaft being changed to decrease a contact area between the transfer roll and the rotation drive shaft and to decrease a close contact force and a frictional force can be prevented, and thus a package transfer speed is decreased like a conventional case.

That is, since a close contact state can be constantly maintained between the outer surface of the turned transfer roll and the outer surface of the normally positioned rotation drive shaft due to an elastic force of the elastic member, the transfer roll can be rotated at a speed corresponding to a rotation speed of the rotation drive shaft and can transfer a package even in the state in which the transfer roll is turned.

In addition, even when the outer diameter decreases due to surface wear of the transfer roll, the close contact state is constantly maintained between the transfer roll and the rotation drive shaft due to the elastic force of the elastic member, and a package can be stably transferred without decreasing a package transfer speed.

In addition, when the drive gear, the first and second upper and lower gears, and the first and second connection gears are returned to an original state by a return operation of the turning motor 146, the transfer roll 110 is returned to an initial state by a return operation of the vertical rotation pin 136 operating in conjunction thereof so that a package can be simply and quickly transferred in the straight direction A changed from the changeable direction B.

According to the exemplary embodiment of the present invention, since transfer rolls of first and second transfer roll groups circumscribed to a rotation drive shaft rotated due to a driving force of a motor are always constantly elastically supported by the rotation drive shaft due to an elastic force of an elastic member, and a close contact state between the transfer rolls, which are turned to change a package transfer direction, and the rotation drive shaft is always constantly maintained, a speed of transferring a package in a straight direction and a slope direction is stably maintained, and efficiency of transferring the package can be improved.

Since the transfer rolls of the pair of left and right first and second transfer roll groups circumscribed to the rotation drive shaft can be simultaneously turned with quick response by a power transmission structure due to gear-coupling applied thereto, work productivity can be improved by quickly changing a package transfer direction according to a high package transfer speed.

Even when an outer diameter of the transfer roll is decreased due to surface wear thereof, since a close contact state between the rotation drive shaft and the transfer roll can be constantly maintained, the package can be stably transferred without decreasing the package transfer speed, a use lifetime of a component can be increased, and a maintenance can be reduced.

The above-described present invention is not limited to the above-described embodiments and the accompanying drawings, and it will be apparent to those skilled in the art that various substitutions, modifications, and changes are possible without departing from the technical spirit of the embodiment.

What is claimed is:

1. A diverter for a transferring conveyor, comprising a carrier module including:
   first and second transfer roll groups including a plurality of transfer rolls rotatably assembled to first assembly holes of roll brackets;
   a rotation drive part which includes
      a rotation drive shaft having a predetermined length and an outer circumferential surface circumscribed to the transfer rolls of the first and second transfer roll groups, which are disposed at both left and right sides of the rotation drive shaft, and
      a rotating motor connected to one end of the rotation drive shaft through a power transmission part to rotate the transfer rolls of the first and second transfer roll groups; and
   a turning variable part which includes
      a horizontal fixed plate rotatably supporting a plurality of vertical rotation pins extending from block bodies, which are coupled to second assembly holes of the roll brackets using hinge shafts,
      first and second upper gears provided on the plurality of vertical rotation pins corresponding to the plurality of transfer rolls of the first and second transfer roll groups disposed along the rotation drive shaft,
      first and second lower gears rotatably supporting first and second connection gears, which are disposed between and gear-coupled to the first and second upper gears adjacent to each other along the rotation drive shaft, on the horizontal fixed plate and disposed on lower end portions of a pair of the vertical rotation pins corresponding to a pair of transfer rolls which are selected from the plurality of transfer rolls of the first and second transfer roll groups, adjacent to each other, and disposed with the rotation drive shaft interposed therebetween, and
      a turning motor configured to rotate drive gears gear-coupled to the first and second lower gears in a normal or reverse direction, and to simultaneously turn the transfer rolls of the first and second transfer roll groups by a predetermined angle,
   wherein the drive gears include
      a first drive gear having an outer diameter which is simultaneously gear-coupled to the first and second lower gears and rotates the first and second lower gears in one direction, and
      a second drive gear provided on a drive shaft of the turning motor and gear-coupled to the first drive gear and having a size smaller than the outer diameter of the first drive gear,
   wherein the first drive gear is assembled to a gear shaft rotatably supported by a connection hole formed to pass through the horizontal fixed plate,
   wherein the pair of the vertical rotation pins are assembled with the drive gears located under the horizontal fixed plate and the first and second lower gears engaged with each other, and the pair of the vertical rotation pins extend longer than vertical rotation pins that are not assembled with the first and second lower gears, and
   wherein at least one carrier module is disposed on a conveyor according to a package transfer direction to turn the plurality of transfer rolls using the turning motor so as to change a transfer direction of a package.

2. The diverter of claim 1, the carrier module comprising elastic support portions elastically support the transfer rolls toward the rotation drive shaft, wherein the elastic support portions include elastic members including lower ends restricted by extension bars extending outward from the block bodies and upper ends restricted by protruding portions extending outward from the roll brackets.

3. The diverter of claim 1, wherein:
   the carrier module includes a module box having an inner space accommodating the first and second transfer roll groups, the rotation drive part, and the turning variable part, and a bottom plate which seals an open lower portion of the module box; and
   the turning motor is perpendicular to and fixedly installed on a motor fixing bracket fixedly installed on the bottom plate to connect the second drive gear of the drive gears exposed under the horizontal fixed plate and the drive shaft.

* * * * *